United States Patent [19]
Yoshizaki et al.

[11] Patent Number: 5,456,063
[45] Date of Patent: Oct. 10, 1995

[54] SECONDARY AIR SUPPLY APPARATUS FOR ENGINE

[75] Inventors: Kouji Yoshizaki, Numazu; Hiroshi Tanaka, Susono, both of Japan

[73] Assignee: Toyota Jidosha Kabushiki Kaisha, Toyota, Japan

[21] Appl. No.: 89,143

[22] Filed: Jul. 7, 1993

[30] Foreign Application Priority Data

Jul. 10, 1992 [JP] Japan ................................. 4-183923
Jun. 11, 1993 [JP] Japan ................................. 5-140993

[51] Int. Cl.⁶ .............................................. F01N 3/20
[52] U.S. Cl. ............................ 60/284; 60/289; 60/300
[58] Field of Search ........................ 60/284, 289, 300, 60/290

[56] References Cited

U.S. PATENT DOCUMENTS

| | | | |
|---|---|---|---|
| 3,503,716 | 3/1970 | Berger | 60/284 |
| 3,775,064 | 11/1973 | Berger | 60/300 |
| 5,146,743 | 9/1992 | Maus | 60/284 |

FOREIGN PATENT DOCUMENTS

| | | | |
|---|---|---|---|
| 54-13820 | 1/1979 | Japan . | |
| 54-13818 | 1/1979 | Japan . | |
| 49520 | 4/1980 | Japan | 60/284 |
| 63-26748 | 2/1988 | Japan . | |
| 1-227815 | 9/1990 | Japan . | |
| 3-500911 | 2/1991 | Japan . | |
| 5-59940 | 3/1993 | Japan . | |
| 5-86845 | 4/1993 | Japan . | |
| 14912 | 9/1992 | WIPO | 60/300 |

Primary Examiner—Douglas Hart
Attorney, Agent, or Firm—Kenyon & Kenyon

[57] ABSTRACT

An apparatus for supplying the secondary air to a catalyst in an exhaust gas passage is disclosed. An electric heater is fixed to the catalyst to which the secondary air is supplied by an electric air pump. The heater and the air pump are connected with a battery through relay contacts, respectively. During the cold operation of the engine, an electric control unit switches on/off the relay contacts, so as to actuate the air pump prior to the heater and stop the air pump after the heater. The secondary air is supplied to the catalyst when the temperature of catalyst is raised up to the activating point.

16 Claims, 9 Drawing Sheets

FB CONTROL INITIATE

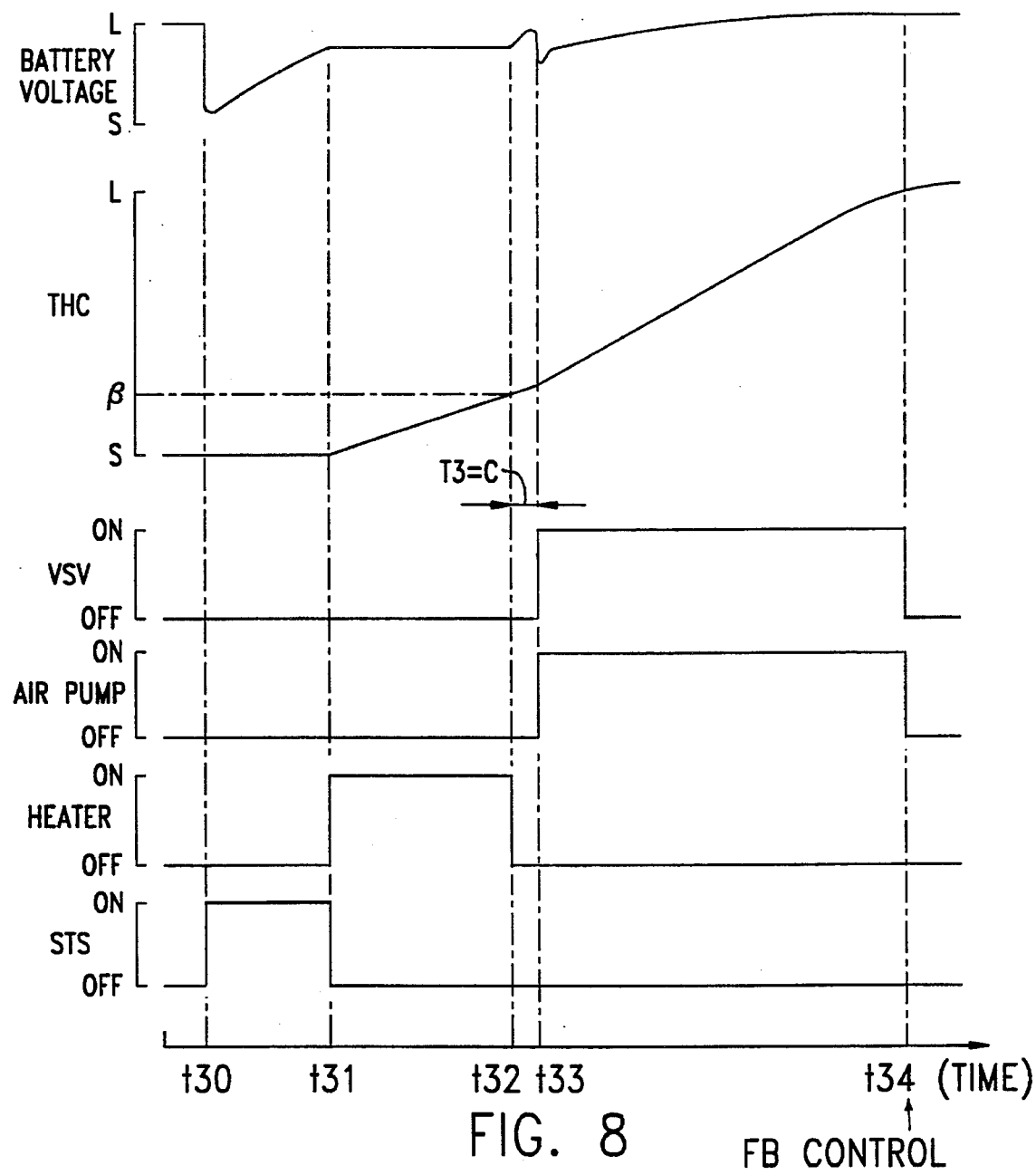
FIG. 8   FB CONTROL INITIATE

SECONDARY AIR SUPPLY APPARATUS FOR ENGINE

BACKGROUND OF THE INVENTION

1. Field of the Invention

The present invention relates generally to an electrically heatable type catalyst which is disposed in an exhaust gas passage of an engine. More particularly, the present invention relates to an apparatus for supplying the secondary air to the heatable type catalyst.

2. Description of the Related Art

Japanese Unexamined Patent Publication 1-227815 discloses an exhaust gas purifying appartus. In this apparatus, the secondary air is supplied to a three way catalytic converter disposed in an exhaust gas passage of an engine when the engine was started in the cold state. By this secondary air supply, the reduction of exhaust gas emission discharging to the atmosphere is realized.

In recent years, for the purpose of earlier activation of the catalyst, the catalyst including an electric heater has been developed. For supplying the secondary air to the catalyst, a developed type of electric air pump has been proposed as a replacement of a known mechanical air pump operably connected to the engine. The proposed air pump has an electric motor which is actuated when required. Therefore, the modification of the prior art is proposed to reduce the exhaust gas emission when the engine is started in the cold state. This is realized by an apparatus which actuates the electric heater of the catalyst when the engine is started in the cold state, and operates the air pump for supplying the secondary air to the catalyst.

Japanese Unexamined Patent Publication 5-59940 discloses an example of the apparatus, namely a catalytic purifying apparatus for an internal combustion engine. In this apparatus, when the temperature of the catalyst is raised to the operational point by actuating the electric heater when the engine is started in the cold state, the electric air pump is activated. In this apparatus, even when the secondary air is supplied to the catalyst of which the temperature has not been raised up to the operational point, heat loss of the catalyst caused by the air flow is greater than of heat generated by the oxygenate reaction. Therefore, before the temperature of the catalyst is raised up to the operational point, the catalyst is heated up by means of the heater so as to become active earlier, without supplying the secondary air to the catalyst.

However, according to the above modified example of the first prior art, the electric heater and electric air pump are simultaneously actuated as the engine is started in the cold state. In this state, the secondary air takes away the heat of the catalyst the temperature of which has not been raised up to the operational point during the heating-up operation for the catalyst. Consequently, the period of time required for the catalyst to become active is extended and the purifying ability of the exhaust gas may be reduced. Further, the electrical power may be wasted because the heater is actuated. Furthermore, the high crush current will flow when the electric motor of the air pump is actuated. Therefore, when the electric heater and electric air pump are simultaneously actuated, a heavy load is applied to a power source such as a battery. As a result, the excessive discharge of the battery may shorten the life span thereof. The load demanding to an alternator mostly disposed in the vicinity of the battery is rapidly increased in response to the lowered battery voltage. This causes the engine to engage in the erroneous rotary motion.

According to the second prior art, when both electric heater and electric air pump are continuously operated even after the temperature of the catalyst was raised up to the operational point, the catalyst may be excessively heated up beyond the required degree by applying the electrical power thereto. The electric power may be wasted by continuously actuating the electric heater of the catalyst and the electric air pump.

SUMMARY OF THE INVENTION

Accordingly, it is a primary object of the present invention to provide a secondary air supply device capable of efficiently warming up the catalyst during the cold operation of the engine, resulting in the improvement of the exhaust gas purifying efficiency.

It is another object of the present invention to provide a secondary air supply device which can lower the waste of the electric power required for warming up the catalyst.

It is a further object of the invention to provide a secondary air supply device reducing the load demanding to a power source.

To achieve the foregoing and other objects and in accordance with the purpose of the present invention, a secondary air supply control device is provided, the device comprising a catalyst disposed in an exhaust gas passage of the engine, means for heating the catalyst, said heating means being arranged to be electrically actuate, an electric air pump for supplying secondary air to the catalyst heated by the heating means in the exhaust gas passage and means for actuating the air pump and the heating means during the cold operation of the engine, wherein the actuating means actuates the air pump prior to the heating means.

BRIEF DESCRIPTION OF THE DRAWINGS

The features of the present invention that are believed to be novel are set forth with particularity in the appended claims. The invention, together objects and advantages thereof, may best be understood by reference to the following description of the presently preferred embodiments together with the accompanying drawings, in which:

FIG. 8 is a time chart which describes the operations of the secondary air supply control according to the fourth embodiment.

DETAILED DESCRIPTION OF THE PREFERRED EMBODIMENTS

The first and second embodiments according to the present invention will now be described. The basic mechanical and electrical concepts of a gasoline engine system according to the present invention will be described in the first embodiment. The second embodiment will be described by emphasizing the difference from the first embodiment.

FIRST EMBODIMENT

The first embodiment according to the present invention will now be described referring to FIGS. 1 through 3.

Figure 1A:
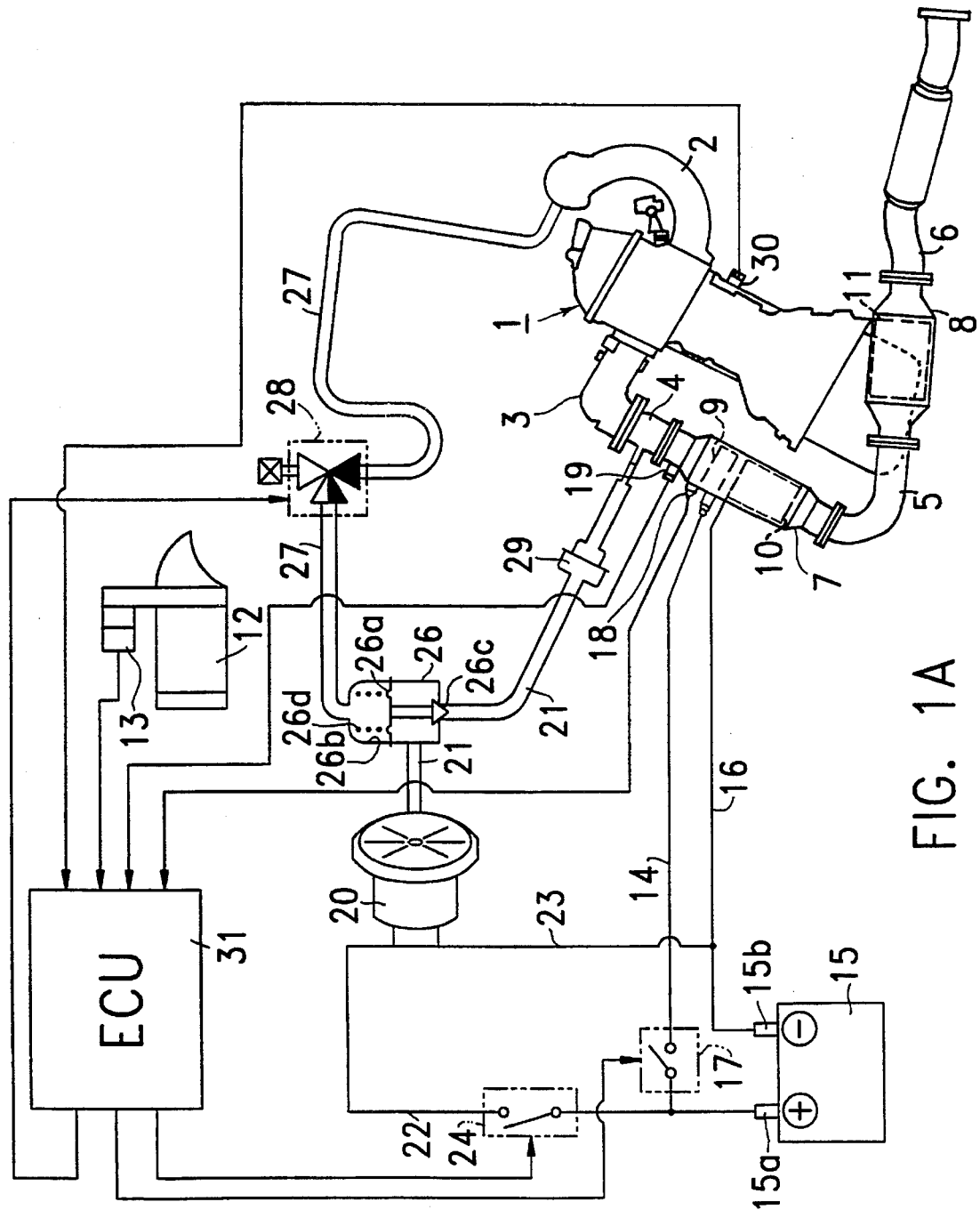
FIG. 1A is a schematic view showing a gasoline engine system according to the first embodiment of the present invention.

As shown in FIG. 1A, an engine 1 of a gasoline engine system is communicated with an intake maniforld 2 and an exhaust manifold 3. Air taken in from the outside by way of intake pipes (not shown) is supplied into combustion chambers of the engine 1 through the intake manifold 2. The burned exhaust gas is guided from the combustion chambers to the exhaust manifold 3. A plurality of exhaust gas pipes 4, 5 and 6 are communicated with the exhaust manifold 3 to discharge the guided exhaust gas to the atmosphere. The exhaust gas pipes 4, 5 and 6 includes a first three way catalytic converter 7 and second three way catalytic converter 8 which are disposed midway along the pipes, respectively. It is a well-known fact that the first and second converters 7 and 8 oxidize hydric carbon (HC) and carbon monoxide (CO) in the exhaust gas, and deoxidize nitrogen oxide (NOx) so as to purify the exhaust gas.

Figure 1B:
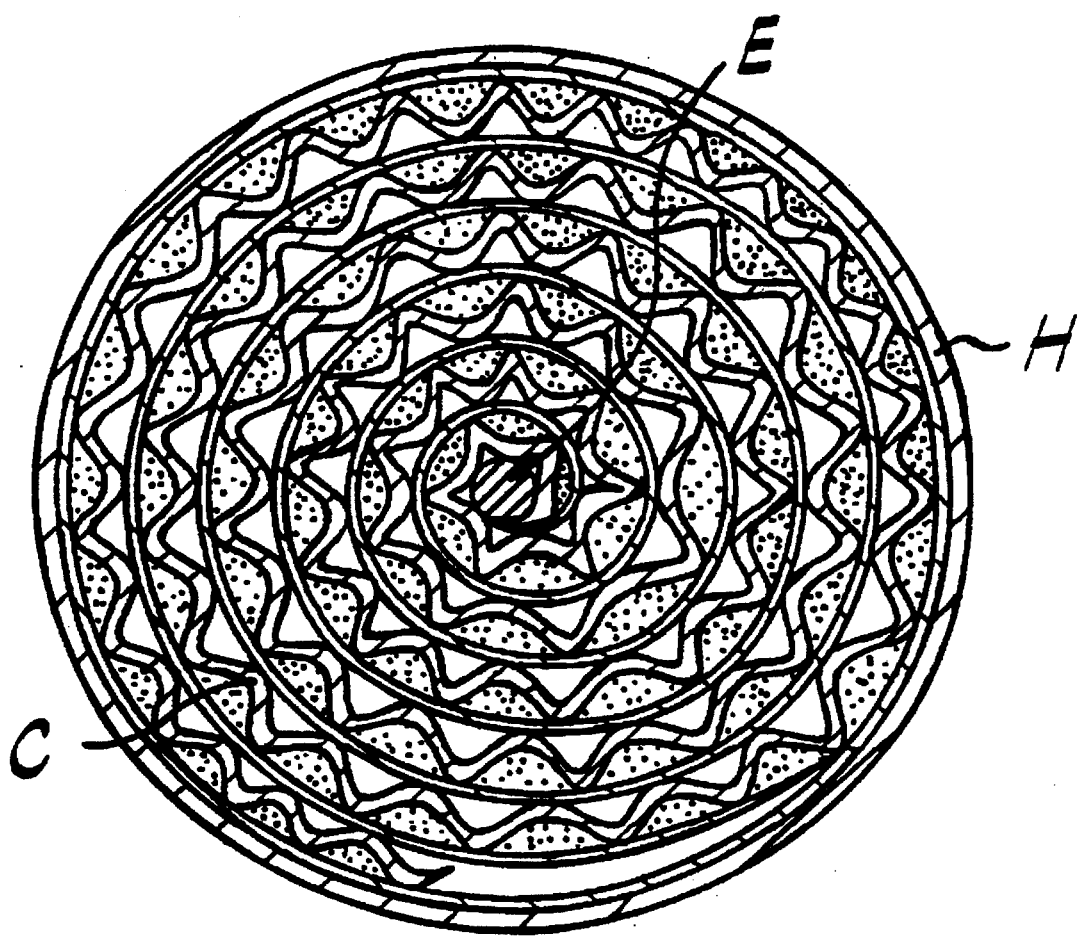
FIG. 1B is a cross section showing a catalyst with an electric heater.

The first converter 7 disposed at the upper steam side in the pipe 4 includes a large and a small three way catalysts. The small catalyst is defined as a heatable catalyst 9. The large catalyst is defined as a main catalyst 10. The catalyst 9 includes honeycomb cores which the three way catalyst is adhered on and form a metal catalyst. As shown in FIG. 1B, an electrode E is disposed in the central portion of the honeycomb cores C, and the section between a hub H and the electrode E is electrically actuated for heating up the metal catalyst. On the other hand, the main catalyst 10 is simply formed by the metal catalyst on which the three way catalyst is adhered. The catalyst 9 is disposed at the further upper stream side from the main catalyst 10, and is mainly actuated when the engine is started in the cold state. The second converter 8 includes only one main catalyst 11. The main catalyst 11 is formed by the metal catalyst on which the three way catalyst is adhered, similar to the above-described catalyst.

When the engine 1 is to be started, the rotary motion caused by the cranking of a starter 12 is transmitted to a crank shft (not shown). A starter switch 13 detects whether the starter 12 is in the ON or OFF state. The starter 12 is switched to either the ON or OFF state according to the ON or OFF condition of an ignition switch (not shown). When the ignition switch is kept in the ON state, the starter switch 13 detects that the starter 12 is in the ON state, and transmits a starter signal STS indicative of the ON state.

For actuating the heater of the catalyst 9, an electrode side of the catalyst 9 is connected, via a power line 14, to a plus electrode 15a of a battery 15 which is a power source for a vehicle. A rib side of the catalyst 9 is electrically connected, via a power line 16, to a negative electrode 15b of the battery 15. Further, to control the power supply from the battery 15 to the heater of the catalyst 9, a first relay switch 17 is provided midway along the power line 14. When the relay switch 17 is energized in response to an electric signal, the switch 17 makes the power line 14. Therefore, the heater of the catalyst 9 becomes actuated upon the power supply from the battery 15. As the relay switch 17 is deenergized when an electric signal not inputted, the switch 17 breaks the power line 14. Therefore, the power supplied from the battery 15 to the catalyst heater is terminated.

The converter 7 includes a temperature sensor 18 for detecting a temperature THC of the catalyst 9. In the converter 7, an oxygen sensor 19 for detecting the oxygen density Ox in the exhaust gas is disposed at the upper stream side of the temperature sensor 18.

It is to be noted that, not shown in FIG. 1, the starter 12 is electrically connected to the plus electrode 15a of the battery 15, via the ignition switch. When the ignition switch is switched on, the starter 12 is actuated by the power supply from the battery 15.

According to this embodiment, an electric air pump 20 is provided for supplying the secondary air to the exhaust gas passage. The air pump 20 accommodates an electric motor for sucking the air therein when actuated. A discharge port of the air pump 20 is communicated with the exhaust pipe 4 which is disposed at the further upper stream side from the converter 7, via an air pipe 21 for supplying the secondary air. A plus terminal of the air pump 20 is connected to the plus electrode 15a of the battery 15 via a power line 22. A negative terminal of the air pump 20 is connected to the negative electrode 15b of the battery 15 via a power line 23. Further, for controlling the power supply to the air pump 20, a second relay switch 24 is disposed midway along the power line 22. The switch 24 is switched on in response to an inputted signal, such that the switch 24 closes the power line 22. Therefore, the air pump 20 is actuated by the power supply from the battery 15. The air sucked by the air pump 20 can be supplied as the secondary air, via the air pipe 21, to the exhaust gas pipe from the upper stream side of the converter 7. When the electric signal is inputted to the switch 24, the switch 24 opens the power line 22. Therefore, the power supply from the battery 15 to the air pump 20 is terminated.

A diaphragmatic air control valve unit 26 is disposed midway along the air pipe 21. The valve unit 26 includes a pressure chamber 26b which is defined by a diaphragm 26a. A valve 26c is secured to the diaphragm 26a. A spring 26d is disposed in the pressure chamber 26b, for urging the diaphragm 26a downward. The valve 26c is held in the position by the urging force of the spring 26d to close the air pipe 21. As a vacuum pipe 27 is communicated with the pressure chamber 26b, the valve 26c can be held in the position where the air pipe 21 is to be opened. The vacuum pipe 27 is communicated with the intake manifold 2. The negative pressure generated in the intake manifold 2 can be induced into the pressure chamber 26b through the vacuum pipe 27. A three way vacuum switching valve (hereinafter referring to as VSV) 28 is disposed midway along the vacuum pipe 27 for regulating the induction amount of the negative pressure to the pressure chamber 26b. The VSV 28 is switched to the opened or closed position upon receipt of the electric signal. When the VSV 28 is energized by the electric signal, the VSV 28 opens the vacuum pipe 27. This opening of the pipe 27 enables the negative pressure to be induced to the pressure chamber 26b. Therefore, the valve 16c is shifted to the opening position against the force of the spring 26d, so as to open the air pipe 21. On the other hand, when the VSV 28 is deenergized, the vacuum pipe 27 is closed. Therefore, the pressure chamber 26b is opened to induce the atmospheric pressure therein. Further, the valve 26c is shifted to the closing position by the urging force of the spring 26d so as to close the air pipe 21.

A check valve 29 is disposed midway along the air pipe 21. The check valve 29 prevents the counter flow of the exhaust gas, resulted from the pulsation thereof.

In addition, a water temperature sensor 30 for detecting the cooling water temperature THW is disposed in the engine 1.

According to this embodiment, an electronic control unit (hereinafter, referring to as ECU) 31 controls the operations of the heater attached to the catalyst 9, the air pump 20 and the VSV 28, respectively. The ECU 31 includes a central processing unit (hereinafter, referring to as CPU) having a free running counter function and several memories which store the predetermined control programs and temporarily store the operation results or the like by the CPU. The ECU 31 consists of a theoretical operation circuit formed by the above-described units which are connected with external input and output interfaces via buses, respectively. The external input interface circuit of the ECU 31 is electrically connected with the starter switch 13, temperature sensor 18, oxygen sensor 19 and water temperature sensor 30, respectively. The external output interface of the ECU 31 is connected with the first and second relay switches 17 and 24, and VSV 28, respectively.

The ECU 31 actuates the air pump 20 after it actuated the heater of the catalyst 9 according to the various signals transmitted from the switch 13, sensors 18 and 30 at the time when the engine was started. After the operation of the heater of the catalyst 9 is terminated, the ECU 31 terminates the operation of the air pump 20. Further, the ECU 31 executes an air-fuel ratio feedback control (i.e., FB control) for the engine in response to the signal transmitted from the sensor 19.

The operation for controlling the secondary air supply executed by the ECU 31 will now be described.

Figure 2:
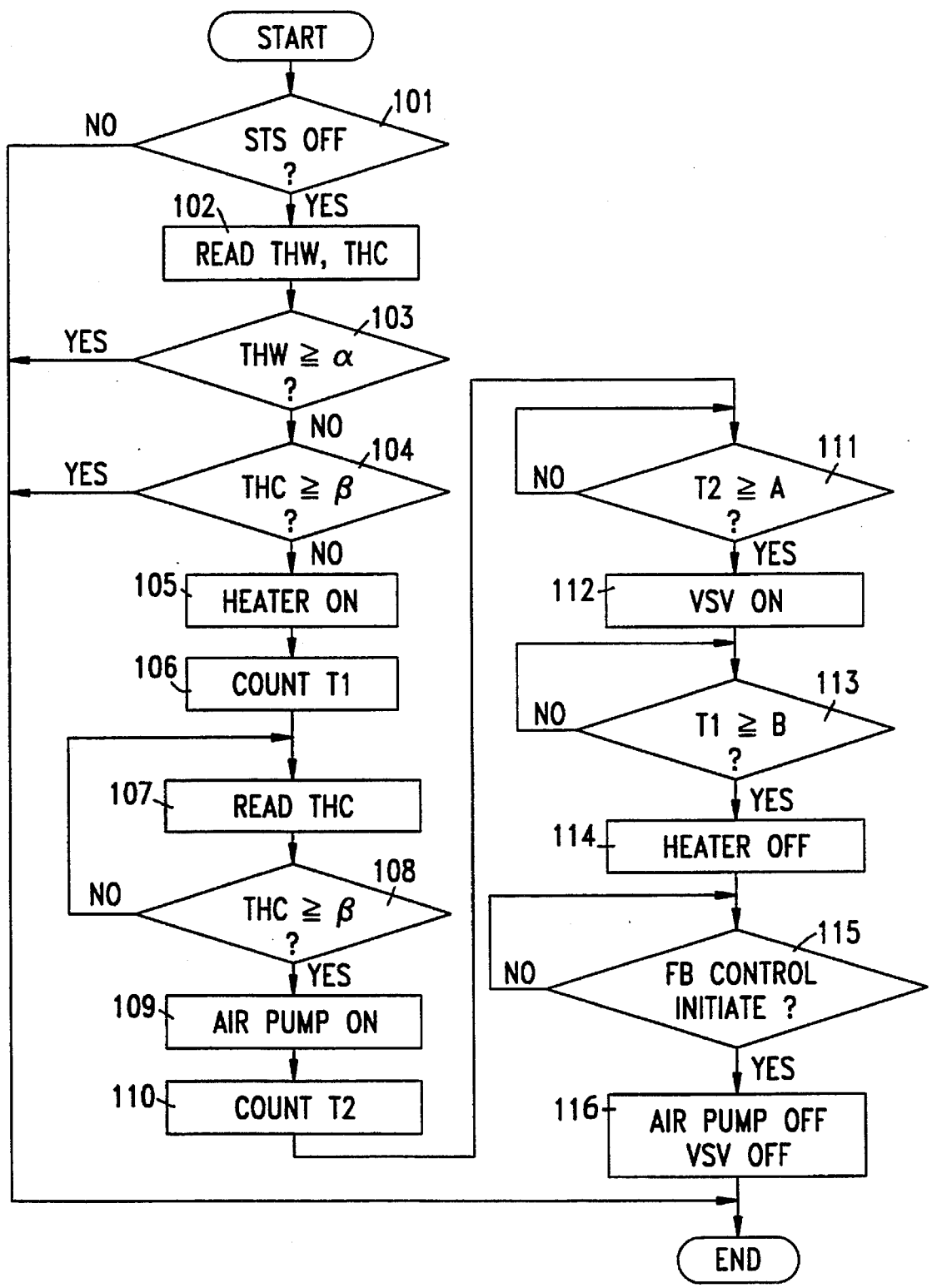
FIG. 2 is a flowchart showing the control routine for supplying the secondary air, which is executed by the ECU for activating the system in FIG. 1.

After the routine shown in FIG. 2 is started, the ECU 31 determines whether the state of the starter signal STS transmitted from the starter switch 13 is switched from ON to OFF (step 101). When the state of the signal STS has not been switched to the OFF state, the ECU 31 determines that the starter 12 is in the cranking operation, and terminates the operations. As the state of the signal STS has been switched to OFF state, the ECU 31 determines that the starter 12 has completed the cranking, and moves to step 102 to execute the next operation.

The ECU 31 reads the coolant temperature THW and catalyst temperature THC according to the signals transmitted from the sensors 30 and 18, respectively (step 102).

The ECU 31 determines whether the coolant temperature THW is raised up to a predetermined value α (i.e., warm-up completion temperature) (step 103). When the temperature THW is raised up to the predetermined value α, in other words, when the engine 1 is already warmed up enough for starting in the warm state, the ECU 31 terminates the operation. When the temperature THW is not raised up to the predetermined value α, in other words, when the engine 1 is not warmed up enough for starting in the cold state, the ECU 31 moves to step 104 to execute the next operation.

The ECU 31 determines whether the catalyst temperature THC is raised to the predetermined value β (i.e., operational temperature) (step 104). When the temperature is raised up to the predetermined value β, the ECU 31 terminates the operation hereafter. When the temperature THC is not raised up to the predetermined value β, the ECU 31 moves to step 105 to heat up the heatable catalyst 9.

The ECU 31 switches on the relay switch 17 so as to actuate the heater of the catalyst 9 by electrical power from the battery 15 (step 105). Therefore, the catalyst 9 becomes heated up.

The ECU 31 starts counting with the free running counter an elapsing time T1 after the heater was actuated (step 106).

The ECU 31 reads the catalyst temperature THC in response to the signal transmitted from the temperature sensor 18 (step 107). The ECU 31 determines whether the temperature THC is raised up to the predetermined value β (step 108). When the temperature THC is not raised up to the predetermined value β, the ECU 31 skips to step 107 to read the temperature THC again. The ECU 31 determines whether the temperature THC is raised up to the predetermined value β again (step 108). That is, the ECU 31 waits until the temperature THC will be raised up to the predetermined value β. On the other hand, when the temperature THC is raised up to the predetermined value β at step 108, the ECU 31 determines that the temperature of the catalyst 9 is raised up enough to the operative point for purifying the exhaust gas, and moves to step 109 to execute the next operation.

The ECU 31 switches on the relay switch 24 so as to actuate the air pump 20 by electrical power from the battery 15 for the preparatory purpose prior to the supplying of the secondary air (step 109).

The ECU 31 starts counting by the free running counter the elapsing time T2 after the air pump 20 was actuated (step 110). The ECU 31 waits until the elapsed time T2 will become a predetermined value A which indicates the enough elapsing time for actuating the air pump 20 as the preparatory purpose passed (step 111). When the elapsing time T2 reaches the predetermined value A, the ECU 31 actuates the VSV 28 (step 112).

The VSV 28 enables the negative pressure to be supplied to the pressure chamber 26b of the control valve 26 through the vacuum pipe 27, such that the valve 26c is shifted to the opening position to open the pipe 21. At this time, for the air pump 20 has been already actuated for the preparatory purpose, the air discharged from the pump 20 is immediately supplied into the exhaust gas passage from the upper stream side of the first converter 7 as the secondary air through the air pipe 21.

The ECU 31 waits until the elapsing time T1 will reach a predetermined value B which indicates the required time for heating up the catalyst to have been terminated (step 113). The predetermined value B is defined as the length of time which is required to raise the temperature of the catalyst 9 up to the activating point β after the heater became actuated. Therefore, even though the value β of the activating point for the catalyst 9 varies according to the decay, the period of time for actuating the catalyst 9 in regard with the predetermined value is securely obtained with surmounting the variation of the period of time. When the elapsing time reaches the predetermined value, the ECU 31 deenergizes the relay switch 17 to terminate the power supply to the heater of the catalyst 9 from the battery 15. Therefore, self-heating up of the catalyst 9 is terminated.

The ECU 31 waits for the initiation of the FB control for the air-fuel ratio of the engine in response to a signal transmitted from the oxygen sensor 19 (step 115). When the FB control is initiated, the ECU 31 de-energize the relay switch 24 to terminate the power supply to the air pump 20 (step 116). Furthermore, the ECU 31 closes the VSV 28.

Therefore, the operation of the air pump 20 is terminated.

Simultaneously, the pressure chamber 26b is released to the atmospheric pressure by means of the VSV 28. Therefore, the valve 26c is moved to the closing position and closes the air pipe 21. As a result, the supply of the secondary air to the exhaust gas passage is terminated.

After completing the operation of step 116, the ECU 31 terminates the routine, and completes the entire operations for the secondary air supply control at the engine start.

The above-mentioned operations will now be described referring to a time chart in FIG. 3. This time chart shows the correlation among the starter signal STS when the engine is started in the cold state, operation of the VSV, catalyst temperature THC and voltage variation of the battery 15.

The state of the starter signal STS is switched from OFF to ON in accordance with the on state of the ignition switch. Then, slightly large amount of electrical power is consumed according to the power supply to the starter 12 being initiated (time t0). Therefore, the battery 15 temporarily rapidly discharges.

Then, when the starter signal STS switches its state from ON to OFF, the heater is actuated to start heating up the catalyst 9 (time t1). In this time, the voltage level of the battery 15 slightly goes down according to the rather large amount of the electrical power is consumed which is caused by the actuation of the heater. As the heater starts heating up, the catalyst temperature THC starts rising.

After that, when the temperature THC reaches the predetermined value $\beta$, the air pump 20 is actuated by the electric power it from the battery 15 (time t2). As a large magnitude of the crush current with respect to the inductive load of the motor flows in the air pump 20, the battery temporarily rapidly discharges.

The elapsing time T2 counted from the time t2, that is, as the period of time after the air pump 20 was initiated reaches the predetermined value A, the VSV 28 is actuated (time t3). The secondary air is started to be supplied into the exhaust gas passage when the VSV 28 is actuated. Therefore, since the secondary air is supplied after the catalyst 9 became active, hydric carbon (HC) and carbon monoxide (CO) in the exhaust gas are efficiently oxidized so as to purify the exhaust gas. Further, the rising ratio of the catalyst temperature THC is greatly increased since time t3, which is originated in the oxygenate reaction.

When the elapsing time T1, that is, the period of time since the heating of the catalyst 9 was initiated reaches the predetermined value B, the heater is stopped to terminate the heating (time t4). At this time, since the temperature THC of the catalyst 9 is raised beyond the required value $\beta$ and satisfies the temperature required for the oxygenate reaction, the purification is not effected even if the heating of the catalyst 9 is terminated. Further, as the electrification to the heater was terminated since time t4, the battery 15 once discharged start to recover to reach the standard level thereof.

The FB control for the air-fuel ratio is to be initiated (time t5). Therefore, the air pump 20 and VSV 28 are simultaneously switched off so as to terminate the supply of the secondary air to the exhaust gas passage.

As clearly described above, according to this embodiment, the sequence of the power supply with respect to the heater of catalyst 9 and the air pump 20 is controlled when the engine was started at the cold state. The heater of the catalyst 9 is actuated first, and then the air pump 20 is actuated. The terminating sequence is controlled in the following way. After the operation of the heater is terminated, then the operation of the air pump 20 is terminated.

Therefore, the power supply to the heater and air pump 20 is never simultaneously carried out, hence the operations of the catalyst 9 and air pump are never initiated simultaneously. The power supply to the electric heater and air pump 20 are never simultaneously terminated, hence the operations of the heater of the catalyst 9 and air pump 20 are never simultaneously terminated.

Therefore, according to this embodiment, oxygen is supplied to the catalyst 9 through the secondary air under the condition that the temperature THC of the catalyst 9 reaches the predetermined actuating point $\beta$. Therefore, according to this embodiment, the heat loss of the catalyst 9 by the flow of the secondary air is eliminated before the temperature THC reaches the predetermined value $\beta$ in comparison to the conventional apparatus the catalyst and air pump of which are simultaneously actuated. As a result, the catalyst 9 can be efficiently rapidly warmed up, such that the temperature THC can be raised up to the predetermined value $\beta$ required for the actuation. Therefore, the purification of the exhaust gas by use of the catalyst 9 can be rapidly realized. In other words, the ability of the catalyst 9 in purifying the exhaust gas can be further improved by utilizing the electric heater when the engine is started in the cold state.

Further, according to this embodiment, after the warming-up when the temperature THC of the catalyst 9 reaches the required value $\beta$, the heater does not consume the excessive electrical power more than the required for heating up the catalyst 9. As a result, the wasting of unnecessary electrical power for heating up the catalyst 9 with the heater can be reduced.

Further, according to this embodiment, since the electric heater of the catalyst 9 and the electric air pump 20 are never simultaneously actuated, the load demanding on the battery 15 can be reduced. It will be more specifically explicated, when the air pump 20 is to be actuated, a large amount of the crush current is to be required in the electric motor. However, since the heater and the air pump 20 are not simultaneously actuated, the load spontaneously demanding on the battery 15 can be reduced. As a result, the spontaneous large electrical power consumption from the battery 15 can be reduced.

Therefore, the excessive discharge of the battery 15 can be reduced such that the decay of the battery 15 can be prevented. Possibly, the load demanding on an alternator which is usually disposed in the vicinity of the battery 15 is not rapidly increased due to the large reduction of the discharge and decay of the battery 15. Consequently, the smooth operation of the engine can be realized.

Furthermore, according to this embodiment, the actuating period of time with respect to the heater of the catalyst 9 is controlled based on the predetermined time period B. Therefore, even the required temperature $\beta$ is varied due to the decay of the catalyst 9 itself, the period of time which is required for the catalyst 9 to become active can be securely obtained. As a result, even when the catalyst 9 decays, the supplying operation of the secondary air is not started before the catalyst 9 is not warmed-up enough. Therefore, the catalyst keeps up its ability in purifying the exhaust gas.

SECOND EMBODIMENT

The second embodiment according to the present invention will now be described referring to FIGS. 4 and 5.

Figure 4:
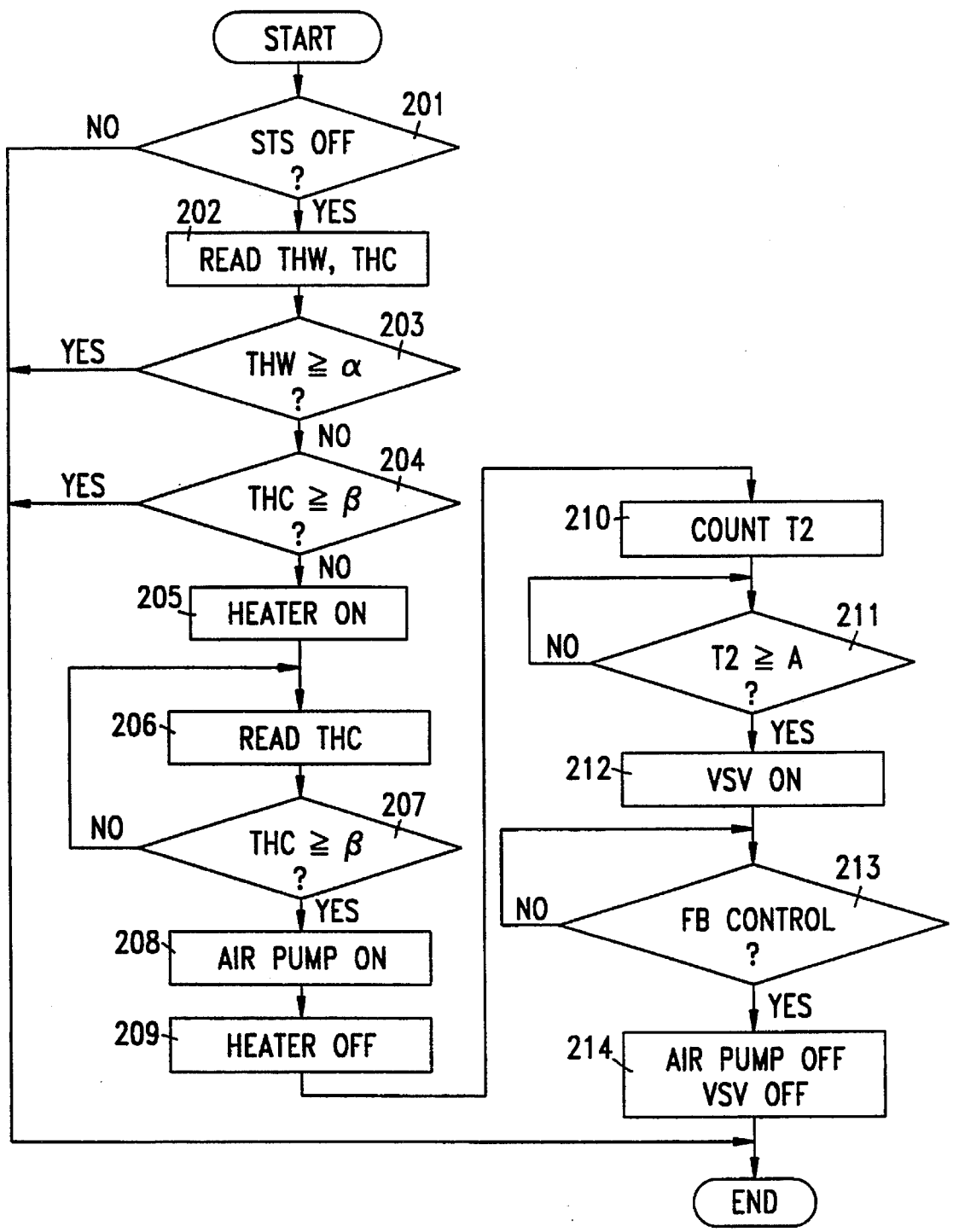
FIG. 4 is a flowchart showing the control routine for supplying the secondary air, which is executed by the ECU according to the second embodiment of the present invention.

According to this embodiment, the ECU 31 executes a routine in the flowchart of FIG. 4. The ECU 31 executes the operations of step 201 through 205. Since the operational contents of steps 201 through step 205 are identical with those of step 101 through 105 in the first embodiment shown in FIG. 2, the explanation will be omitted.

As the ECU 31 advances its execution from step 205 to step 206, the ECU 31 waits until the catalyst temperature THC will reach the predetermined value β according to a signal transmitted from the sensor 18 (steps 206 and 207). When the temperature THC reaches the predetermined value β, the ECU 31 determines that the temperature of the catalyst 9 has reached the activating point which is high enough for efficiently purifying the exhaust gas through the heating-up operation by the electric heater, and advances its execution to step 208.

The ECU 31 energizes on the second relay switch 24, for actuating the air pump 20 (step 208). Therefore, the air pump 20 is preparatorily actuated prior to the secondary air supply.

The ECU 31 deenergizes the first relay switch 17 for deelectrifying the catalyst 9 by terminating electrical power from the battery 15. Therefore, the heating of the catalyst 9 is stopped (step 209).

The ECU 31 starts counting the elapsing time T2 after the air pump 20 was actuated by means of the free running counter (step 210). The ECU 31 counts until the elapsing time T2 will reach the predetermined value A which is required for the air pump 20 to be preparatorily actuated (step 211). When the elapsing time T2 reaches the predetermined value A, the ECU 31 turns on the VSV 28 (step 212).

Through the above-described operations, the valve 26c of the control valve 26 is shifted to the opening position, and opens the air pipe 21. The secondary air pumped out from the air pump 20 preparatorily actuated is immediately supplied to the exhaust gas passage from the upper stream side of the first catalytic convertor 7.

The ECU 31 determines whether the air-fuel ratio FB control for the engine has been initiated (step 213). When the ECU 31 determines that the FB control is initiated, the ECU 31 deenergizes the second relay switch 24 so as to bring the air pump 20 to stop by terminating electrical power from the battery 15, and simultaneously switches off the VSV 28 (step 214).

Through the above-described operations, the operation of the air pump 20 is terminated, and the valve 26c of the unit 26 is shifted to the closing position by means of the VSV 28 so as to close the air pipe 21. As a result, the secondary air supply from the upper stream side of the catalytic converter 7 to the exhaust gas passage is suspended.

Figure 3:
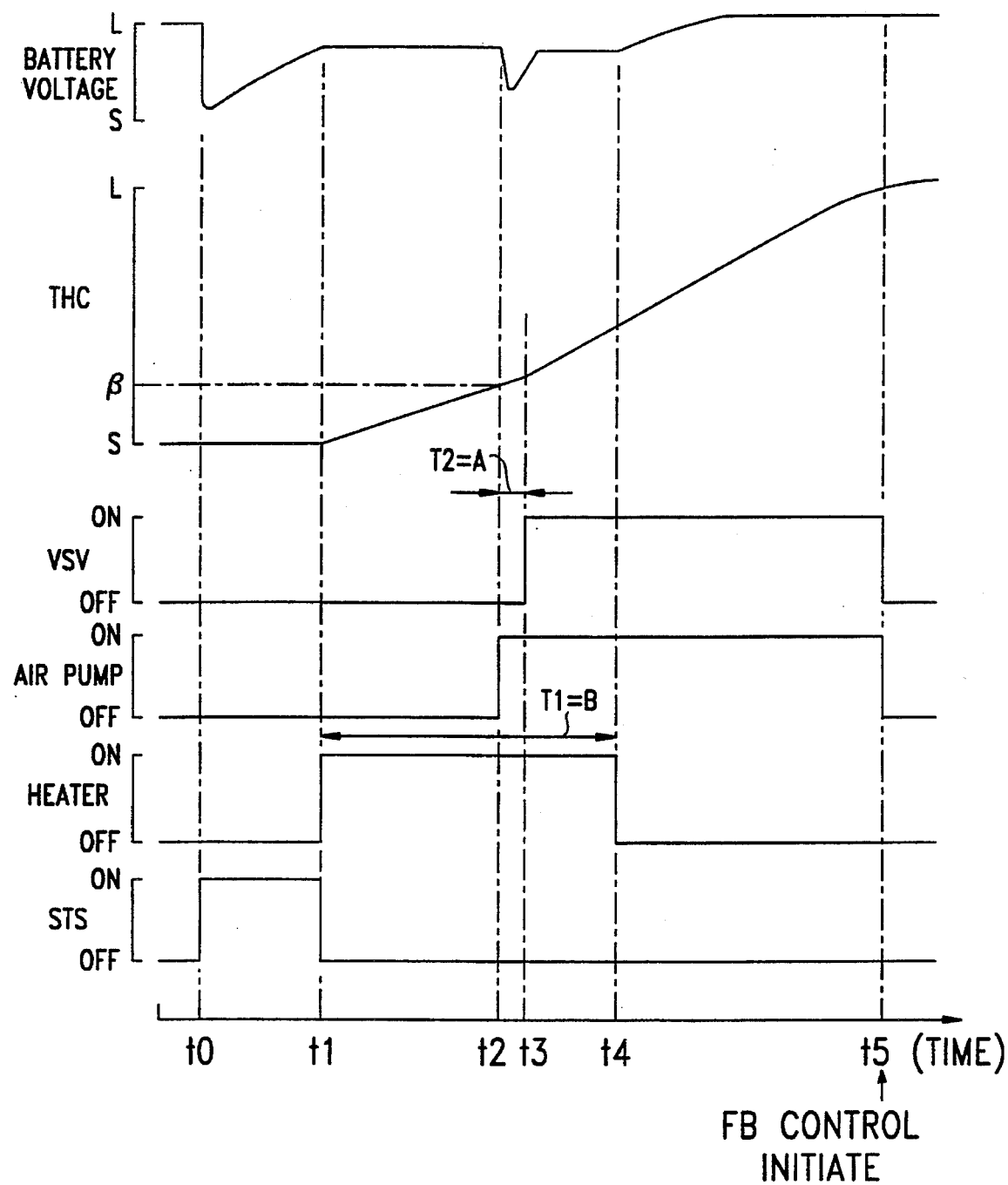
FIG. 3 is a time chart which corresponds to the flowchart of FIG. 2.
Figure 5:
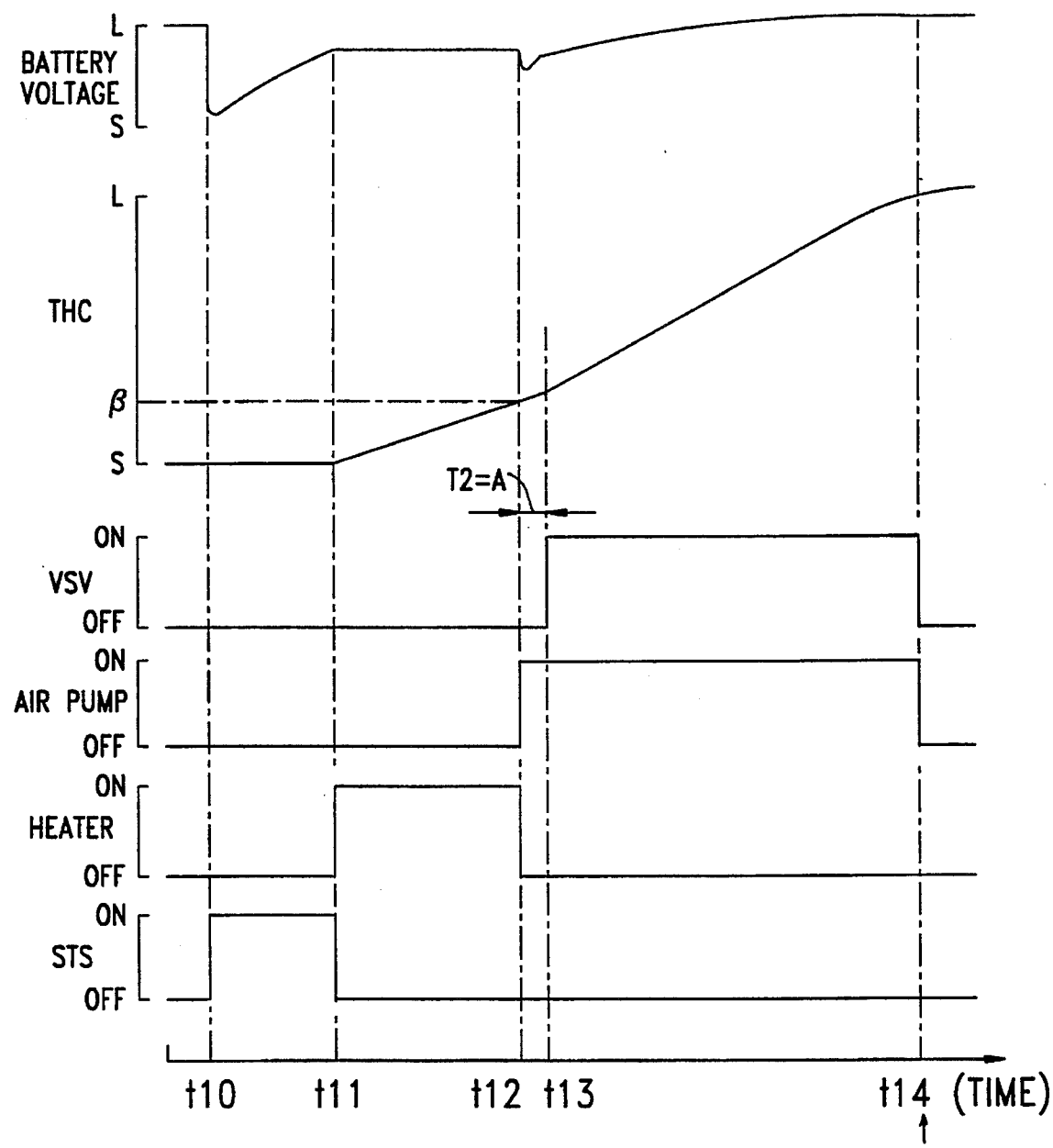
FIG. 5 is a time chart which corresponds to the flowchart in FIG. 4.

FIG. 5 shows a time chart similar to that in FIG. 3 of the first embodiment.

When the state of the starter signal STS is switched from OFF to ON, the battery 15 is temporarily rapidly discharges in response to the initiation of the actuation of the starter 12 (time t10).

After that, when the state of the starter signal STS is switched from ON to OFF, the electric heater starts heating up the catalyst thanks to the electrical power from the battery 15 (time t11). At this time, the voltage level of the battery 15 is slightly lowered in response to the power supply to the electric heater of the catalyst 9. The catalyst temperature THC starts rising.

When the catalyst temperature THC is raised up to the predetermined value β, the power supply to the heater of the catalyst 9 is terminated. Simultaneously the air pump 20 is actuated (time t12). As the crush current flows into the air pump 20 with respect to the inductive load of the electric motor, the battery 15 begins temporarily rapidly discharging.

When the elapsing time T2 reaches the predetermined value A since the air pump 20 was actuated, the VSV 28 is switched on (time t13). The secondary air to the exhaust gas passage is started to be supplied at the timing when the VSV 28 be actuated. Therefore, since the oxygen is supplied through the secondary air to the catalyst 9 in active state, hydric carbon (HC) and carbon monoxide (CO) in the exhaust gas are sufficiently oxidized so as to effectively purify the exhaust gas. The rising ratio of the catalytic temperature THC is increased from time t13 in relation to the oxygenate reaction. Since the temperature THC of the catalyst 9 is raised up beyond the predetermined value β, which means that the temperature of the catalyst 9 reaches the value high enough for the oxygenate reaction, the purifying operation is no longer affected even when the heating-up of the catalyst 9 is terminated. Further, as the power supply to the electric heater was terminated since time t12, the voltage level of the battery 15 once dropped gradually recovers to its original level.

When the FB control for the engine is initiated, the air pump 20 and VSV 28 are simultaneously switched off so as to terminate the secondary air supply to exhaust gas passage (time t14).

According to this embodiment, the sequence of the power supply to the electric heater of the catalyst 9 and air pump 20 are controlled, when the engine is started in the cold state. Through this control, the electric heater is switched on and then off when the temperature THC of the catalyst 9 reaches the predetermined value β. Simultaneously the air pump 20 is actuated. Therefore, the simultaneous power supply to the electric heater and the electric air pump 20 can be avoided.

Furthermore, this embodiment can achieve the same advantages as the ones achieved in the first embodiment.

THIRD EMBODIMENT

Figure 6:
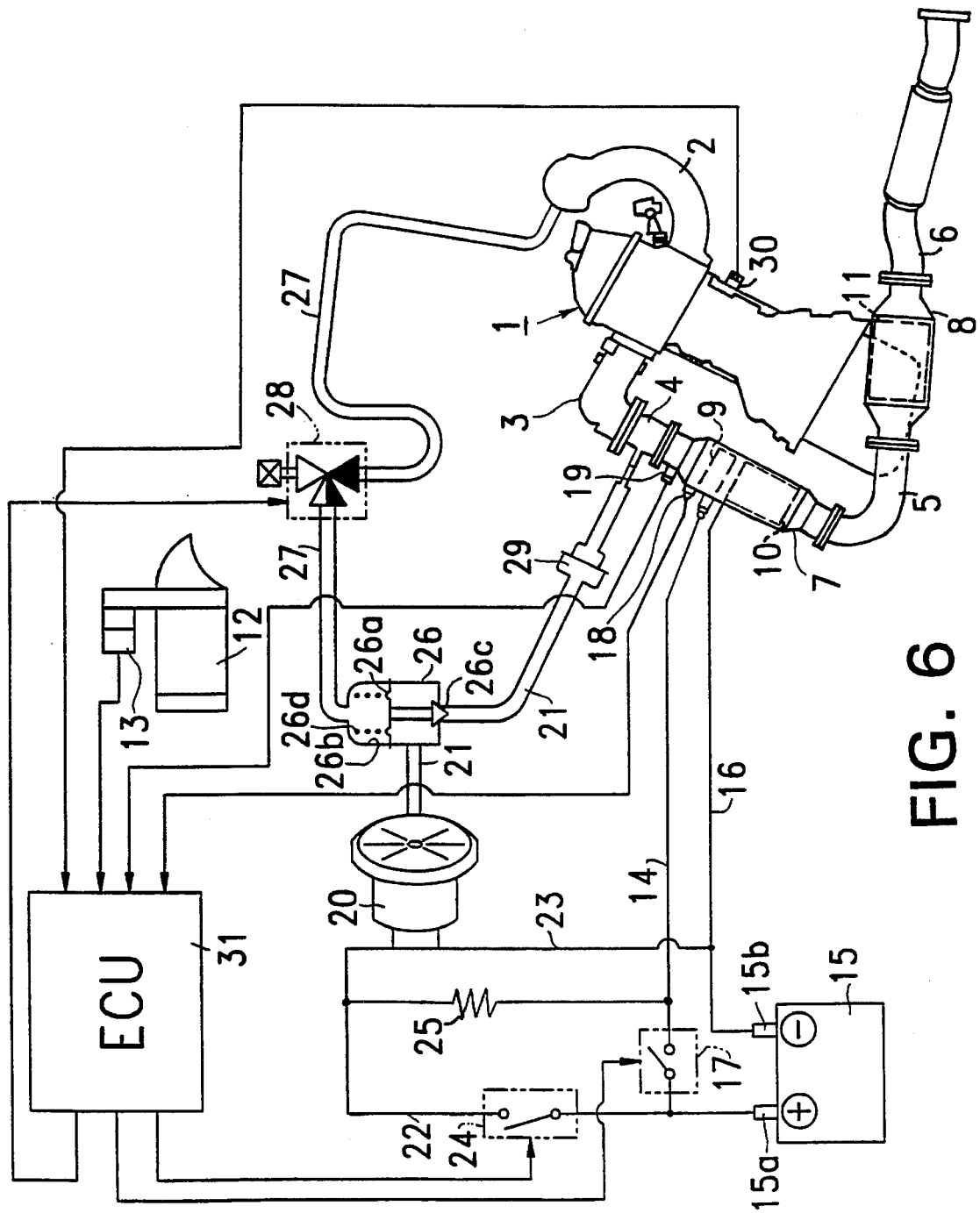
FIG. 6 is a schematic view of a gasoline engine system according to third embodiment of the present invention.

The third embodiment according to the present invention will now be described referring to FIG. 6. This embodiment is a modification of the first embodiment. More specifically, according to the first embodiment, the heater 9 and the air pump 20 are simultaneously actuated for a certain period after the heater was actuated. This sequence is set by controlling the power supply to the heater and pump. In this embodiment, the air pump 20 is actuated in the low voltage condition while the heater and air pump 20 are simultaneously actuated.

For example, a resistor 25 can be provided between the power lines 14 and 22 for actuating the air pump 20 in the low voltage condition when the first relay switch 17 is switched on. In this case, when the air pump 20 is actuated due to the electric power supplied thereto, a large amount of the crush current will supplied into the electric motor. However, in this period of time, as the electric motor is actuated in the low voltage condition through the resistor 25, the crush current can be reduced to the some lowered level. Further, the required amount of electrical power for simultaneously actuating the heater of the catalyst 9 and pump 20 can be reduced. Therefore, the load for the battery 15 can be reduced.

FOURTH EMBODIMENT

The fourth embodiment according to the present invention will now be described referring to FIG. 7.

Figure 7:
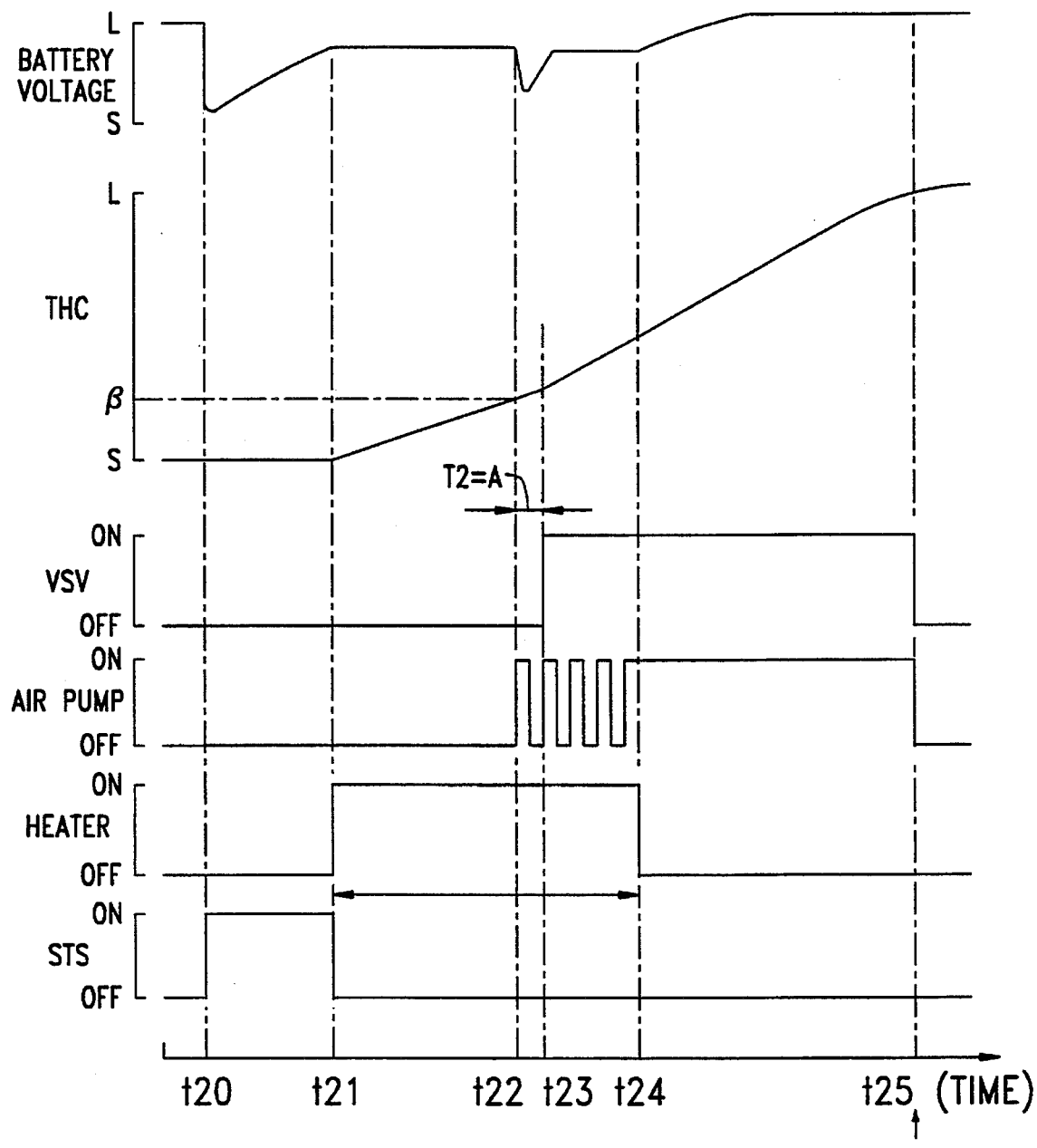
FIG. 7 is a time chart which describes the operations of the secondary air supply control.

As shown in a time chart of FIG. 7, the second relay switch 24 is designed to be actuated by some duty ratio of the intermittent power supply in the period of time between time t22 and t24. Through this operation, the air pump 20 can be actuated in the low voltage condition, which is achieved by periodically switching on/off the air pump 20 only in this period of time. In this case, the required amount of the electrical power for simultaneously activating the electric heater and air pump 20 can be reduced. Therefore, the load demanding on the battery 15 can be reduced.

Although only four embodiments have been described herein, it should be apparent to those skilled in the art that the present invention may be embodied in many other specific forms without departing from the spirit or scope of the invention. Particularly, it should be understand that the following modes are embodied in the present invention.

As shown in a time chart of FIG. 8, the electric heater of the catalyst 9 is not actuated (time t32). When the elapsing time T3 reaches a predetermined value C (time t33), the electric pump 20 and VSV 28 can be simultaneously switched on. In this case, the voltage level of the battery 15 can be raised up to some degree during the period of time from the end of operation of the electric heater to the actuation of the electric air pump 20. Therefore, the drop of voltage level originated during the actuation of the electric air pump 20 can be suppressed by some degree.

Therefore, the present examples and embodiments are to be considered as illustrative and not restrictive and the invention is not to be limited to the details giving herein, but may be modified within the scope of the appended claims.

What is claimed is:

1. A secondary air supply control apparatus for an engine comprising:
   a catalyst disposed in an exhaust gas passage of the engine, wherein the catalyst is activated at a predetermined activation temperature;
   means for heating the catalyst, said heating means being arranged to be electrically actuated, wherein said heating means heats the catalyst for a first predetermined time period to raise the catalyst temperature to the predetermined activation temperature;
   an electric air pump for supplying secondary air to the catalyst heated by the heating means in the exhaust gas passage; and
   means for actuating the air pump and the heating means during the cold operation of the engine, wherein the air pump is not actuated until a predetermined lag time has elapsed since the heating means has been actuated.

2. An apparatus as set forth in claim 1, wherein the air pump is deactivated after a second predetermined time period, since the heating means has been deactivated, has elapsed.

3. An apparatus as set forth in claim 1 further comprising a sensor for detecting a temperature of the catalyst, wherein said actuating means actuates the air pump in accordance with a signal from the sensor.

4. An apparatus as set forth in claim 1, wherein said actuating means actuates the heating means for the predetermined term required for raising the catalyst temperature up to an activating point.

5. An apparatus as set forth in claim 2, wherein said actuating means applies low voltage to the air pump when the actuating means actuates the heating means and the air pump simultaneously.

6. An apparatus as set forth in claim 2, wherein said actuating means includes an electric control unit for controlling the power supply from a power source to the heating means and the air pump.

7. An apparatus as set forth in claim 6 further including a first switch disposed between the power source and the heating means, and a second switch between the power source and the air pump, the switches being actuated by the control unit.

8. An apparatus as set forth in claim 7 further comprising:
   an intervening passage connecting the air pump with the exhaust gas passage;
   a valve disposed in the intervening passage, said valve being held in a closed position for interrupting the connection between air pump and exhaust gas passage, and switched to an opened position upon the application of the negative pressure;
   an inductive passage for connecting an intake manifold of the engine and the valve;
   an electric valve disposed in the inductive passage, said electric valve being held in a closed position, and switched to an opened position upon the input of the signal from the control unit.

9. An apparatus as set forth in claim 1, wherein said heating means includes an electric heater integrally formed with the catalyst.

10. A secondary air supply control apparatus for an engine comprising:
    a catalyst disposed in an exhaust gas passage of the engine, said catalyst being arranged to be activated at a predetermined catalyst activation temperature;
    an electric heater formed integrally with the catalyst for heating the catalyst, wherein said heater heats the catalyst for a first predetermined time period to raise the catalyst temperature to the predetermined catalyst activation temperature;
    an electric air pump for supplying secondary air to the catalyst heated by the heater; and
    an electric control unit for controlling the power supply from a power source to the electric heater and the air pump during the cold operation of the engine, wherein the air pump is not actuated until after a predetermined lag time has elapsed since the heater has been actuated.

11. An apparatus as set forth in claim 10, wherein the air pump is deactivated after a second predetermined time period, since the heater has been deactivated, has elapsed.

12. An apparatus as set forth in claim 11, wherein said actuating means applies low voltage to the air pump when the actuating means actuates the heater and the air pump simultaneously.

13. An apparatus as set forth in claim 10, further comprising:
    an intervening passage connecting the air pump with the exhaust gas passage;
    a first valve disposed in the intervening passage, said first valve being held in a closed position for interrupting the connection between the air pump and the exhaust gas passage, wherein the first valve is switched to an open position upon the application of negative pressure to the first valve;
    an inductive passage for connecting an intake manifold of the engine and the first valve; and
    an electric valve disposed in the inductive passage, wherein the electric valve is held in a closed position until being switched to an open position upon the input of a signal from the control unit.

14. A secondary air supply control apparatus for an engine comprising:
    a catalyst disposed in an exhaust gas passage of the engine, said catalyst being arranged to be activated at a predetermined catalyst activation temperature;

an electric heater formed integrally with the catalyst for heating the catalyst, wherein said heater heats the catalyst for a first predetermined time period to raise the catalyst temperature to the predetermined catalyst activation temperature;

an electric air pump for supplying secondary air to the catalyst;

an electric control unit for controlling the power supply from a power source to the electric heater and the air pump during the cold operation of the engine, wherein the air pump is not actuated until after a predetermined lag time has elapsed since the heater has been actuated;

an intervening passage connecting the air pump with the exhaust gas passage;

a valve disposed in the intervening passage, said valve being held in a closed position for interrupting the connection between the air pump and the exhaust gas passage, wherein said valve is switched to an opened position upon the application of negative pressure;

an inductive passage for connecting an intake manifold of the engine and the valve; and an electric valve disposed in the inductive passage, said electric valve being held in a closed position, and switched to an opened position upon the input of a signal from the control unit.

15. An apparatus as set forth in claim 14, wherein said actuating means applies low voltage to the air pump when the actuating means actuates the heating means and the air pump simultaneously.

16. A secondary air supply control apparatus for an engine, said apparatus comprising:

a catalyst disposed in an exhaust gas passage of the engine, said catalyst being arranged to be activated at a predetermined catalyst activation temperature;

an electric heater integrally formed with the catalyst for heating the catalyst, wherein said heater heats the catalyst for a first predetermined time period to raise the catalyst temperature to the predetermined catalyst activation temperature;

an electric air pump for supplying secondary air to the catalyst to facilitate the purification of exhaust gas by the catalyst;

means for actuating the electric heater and the electric air pump; and means for controlling the means for actuating so that the air pump is not actuated until after a predetermined lag time has elapsed since the heater has been actuated.

* * * * *

UNITED STATES PATENT AND TRADEMARK OFFICE
CERTIFICATE OF CORRECTION

PATENT NO. : 5,456,063

DATED : October 10, 1995

INVENTOR(S) : Kouji YOSHIZAKI et al.

It is certified that error appears in the above-identified patent and that said Letters Patent is hereby corrected as shown below:

| Column | Line | |
|---|---|---|
| 1 | 18 | Change "was" to --is--. |
| 2 | 1 | After "in" delete "the". |
| 2 | 5 | Change "was" to --is--. |
| 3 | 26 | Change "includes" to --include--. |
| 3 | 54 | Change "shft" to --shaft--. |
| 4 | 6 | After "signal" insert --is--. |
| 4 | 47 | After "in" delete "the". |
| 4 | 64 | Change "16c" to --26c--. |
| 5 | 6 | Change "resulted" to --resulting--. |
| 5 | 27 | After "it" insert --has--. |
| 5 | 29 | Before "sensors" insert --and--. |

UNITED STATES PATENT AND TRADEMARK OFFICE
CERTIFICATE OF CORRECTION

PATENT NO. : 5,456,063

DATED : October 10, 1995

INVENTOR(S) : Kouji YOSHIZAKE et al.

It is certified that error appears in the above-identified patent and that said Letters Patent is hereby corrected as shown below:

| Column | Line | |
|---|---|---|
| 5 | 44 | Change "As" to --When--. |
| 6 | 17 | Change "will be" to --is--. |
| 6 | 30 | Delete "will". |
| 6 | 31 | Change "become" to --becomes--; change "the" to --that--. |
| 6 | 33 | After "purpose" insert --has--. |
| 6 | 39 | Change "for" to --since--. |
| 6 | 45 | Change "will reach" to --has reached--. |
| 6 | 46 | After "indicates" insert --that--. |
| 6 | 47 | Change "to have been" to --has--. |

UNITED STATES PATENT AND TRADEMARK OFFICE
CERTIFICATE OF CORRECTION

PATENT NO. : 5,456,063
DATED : October 10, 1995
INVENTOR(S) : Kouji YOSHIZAKI et al.

It is certified that error appears in the above-identified patent and that said Letters Patent is hereby corrected as shown below:

| Column | Line | |
|---|---|---|
| 6 | 54 | Change "regard with" to --regard to--. |
| 6 | 55 | Change "with" to --by--. |
| 6 | 64 | Change "de-energize" to --de-energizes--. |
| 7 | 24 | After "power" delete "is". |
| 7 | 29 | After "power" delete "it". |
| 7 | 54 | Change "start" to --starts--. |
| 7 | 56 | Change "to be" to --then--. |
| 7 | 63 | Change "was" to --is--. |
| 8 | 26 | After "consume" delete "the". |
| 8 | 27 | Before "required" change "the" to --is--. |

UNITED STATES PATENT AND TRADEMARK OFFICE
CERTIFICATE OF CORRECTION

PATENT NO. : 5,456,063

DATED : October 10, 1995

INVENTOR(S) : Kouji YOSHIZAKI et al.

It is certified that error appears in the above-identified patent and that said Letters Patent is hereby corrected as shown below:

| Column | Line | |
|---|---|---|
| 8 | 34 | Change "It will be more specifically explicated," to --More specifically,--. |
| 8 | 36 | Delete "to be". |
| 8 | 53 | After "even" insert --if--. |
| 8 | 58 | Before "warmed up" delete "not". |
| 9 | 6 | Change "will reach" to --reaches--. |
| 9 | 24 | Change "will reach" to --reaches--. |
| 9 | 35 | Change "convertor" to --converter--. |
| 9 | 40 | Before "stop" insert --a--. |
| 9 | 52 | After "15" delete "is". |

UNITED STATES PATENT AND TRADEMARK OFFICE
CERTIFICATE OF CORRECTION

PATENT NO. : 5,456,063
DATED : October 10, 1995
INVENTOR(S) : Kouji YOSHIZAKI et al.

It is certified that error appears in the above-identified patent and that said Letters Patent is hereby corrected as shown below:

| Column | Line | |
|--------|------|---|
| 9 | 58 | Change "thanks to" to --using--. |
| 10 | 5 | Change "timing" to --time--. |
| 10 | 6 | Change "be" to --is--. |
| 10 | 53 | Change "will" to --is--. |
| 11 | 58 | Change "term" to --time--. |

Signed and Sealed this

Ninth Day of April, 1996

Attest:

BRUCE LEHMAN

Attesting Officer

Commissioner of Patents and Trademarks